United States Patent [19]

Godfrey

[11] Patent Number: 5,297,581
[45] Date of Patent: Mar. 29, 1994

[54] PIPELINE PLUGGER

[75] Inventor: Geoffrey C. Godfrey, Mansfield, United Kingdom

[73] Assignee: Underpressure Engineering Co. Limited, Nottinghamshire, United Kingdom

[21] Appl. No.: 916,521

[22] Filed: Jul. 20, 1992

[30] Foreign Application Priority Data

Jul. 25, 1991 [GB] United Kingdom ............... 9116111

[51] Int. Cl.5 .......................................... F16L 55/12
[52] U.S. Cl. ...................................... 138/94; 138/89; 137/315
[58] Field of Search .................. 138/89, 94, 90, 97; 137/315, 318, 319, 320

[56] References Cited

U.S. PATENT DOCUMENTS

| | | | |
|---|---|---|---|
| 1,833,700 | 11/1931 | Wolf | 138/94 |
| 3,154,106 | 10/1964 | Ver Nooy | 138/94 |
| 3,442,295 | 5/1969 | Ver Nooy | 138/94 |
| 4,064,912 | 12/1977 | Petrone | 138/94 |
| 4,175,581 | 11/1979 | Peterson | 138/94 |
| 4,184,504 | 1/1980 | Carmichael et al. | 138/94 |
| 4,202,377 | 5/1980 | Harrison | 138/94 |
| 4,204,661 | 5/1980 | Stromberg | 138/94 |
| 4,282,894 | 8/1981 | Mills et al. | 137/317 |
| 4,503,879 | 3/1985 | Lazarus | 138/94 |
| 5,082,026 | 1/1992 | Smith | 138/94 |

FOREIGN PATENT DOCUMENTS

| | | | |
|---|---|---|---|
| 663434 | 5/1963 | Canada | 138/94 |
| 1230891 | 9/1960 | France | |
| 2073000 | 9/1971 | France | |

*Primary Examiner*—James E. Bryant, III
*Attorney, Agent, or Firm*—Trexler, Bushnell, Giangiorgi & Blackstone, Ltd.

[57] ABSTRACT

Pipeline plugger has a piston (22) on its push-pull rod (16) in a cylinder (23) the lower end (25, 26) of which is sealed to the swivel member (24) in which the push-pull rod is sealingly slidable, the upper end (29) of the cyliner (23) is slidably sealed on the push-pull rod, a vent hole (30) to atmosphere is provided from the cylinder (23) adjacent the swivel seal (15), and a bleed passageway (31) is provided in the push-pull rod from adjacent the plug (18) to just above the piston (22), whereby, when the damper type valve (12) is opened, gas admitted into the chamber (14) is bled through the passageway (31) to above the piston (22), thus applying a downward load on the piston annulus to counterbalance the upward gas load on the push-pull rod (16), so that the plug (18) can then be pushed down easily into the pipe (11) through the valve (12), the branch (13) and the hole (19) in the pipe.

7 Claims, 4 Drawing Sheets

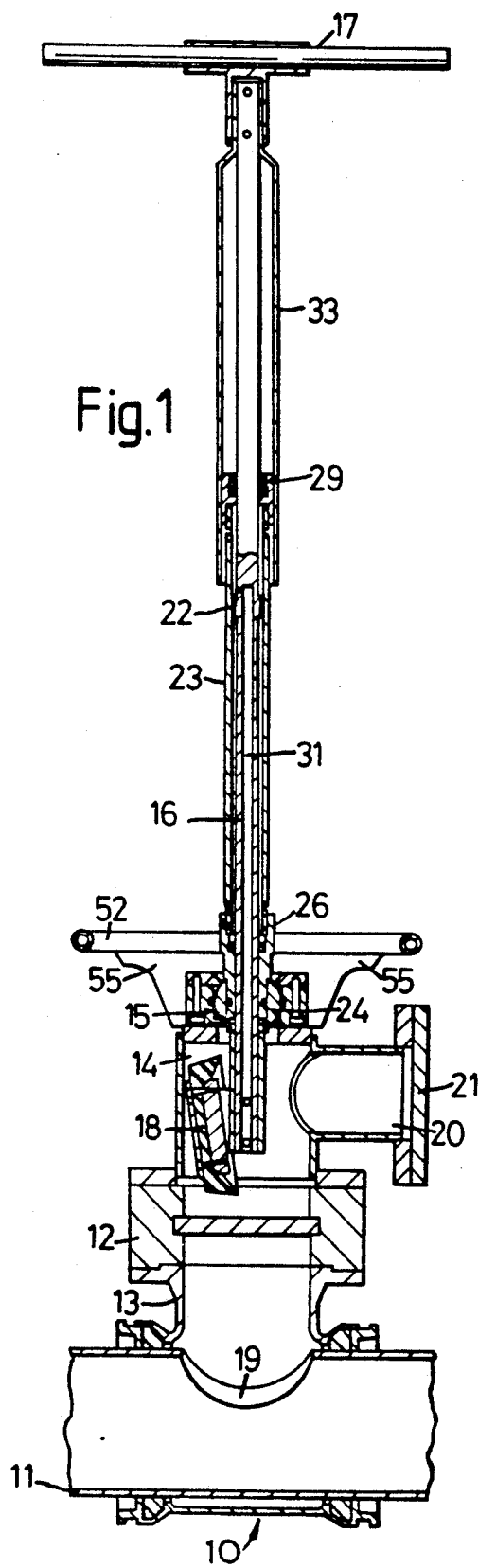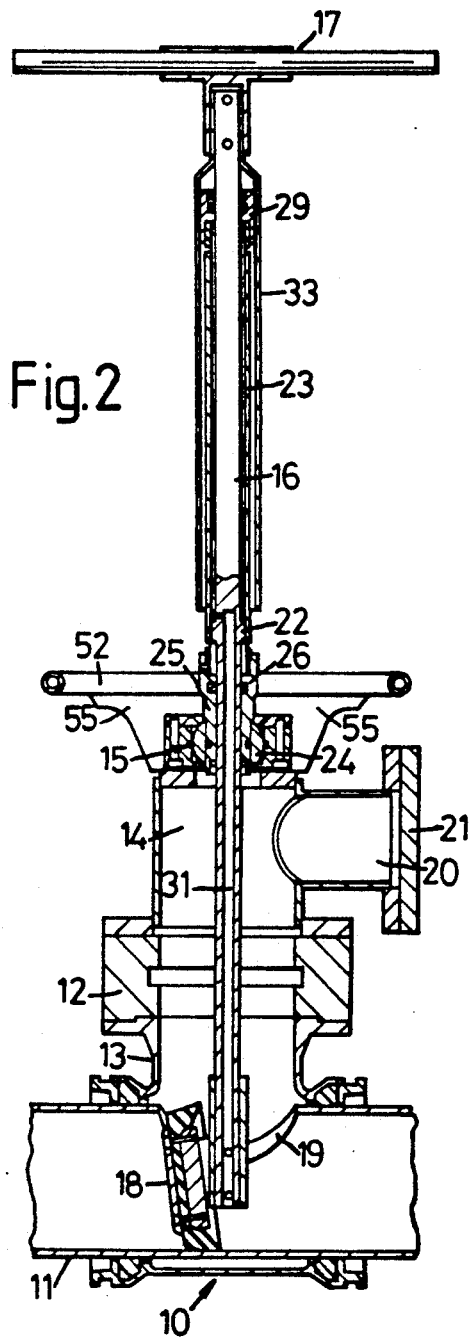

PIPELINE PLUGGER

This invention relates to means for plugging fluid pipes, e.g. gas mains, usually in two places to isolate lengths that require essential work.

Such pipe plugging means usually consists of a split branch connection for fitting around the pipe and having a damper type valve for closing and opening the branch (through which valve, in its open position, the pipe is drilled, the drilling machine being removed after the valve has been closed), a chamber sealed to the valve and having a swivel seal for a push-pull rod extending upwards from the inner side of the swivel seal to an operating handle at the outer side of the swivel seal, and a pipe plug carried by the inner end of the push-pull rod, the swivel seal and the push-pull rod enabling the plug to be pushed down, after opening of the valve, from within the chamber, down through the valve, the branch and the hole drilled in the pipe, into the pipe, and then moved sideways to fit sealingly in the pipe to one side of the hole.

However, with increasing fluid pressures being encountered, the load on the plug in the chamber after opening of the valve can be so great that it becomes extremely difficult—if not impossible—to push the plug manually through the valve, the branch and the hole and into the pipe.

One aspect of the present invention is aimed at overcoming this difficulty.

The increasing fluid pressures encountered also pose problems with the swivel seal, so another aspect of the present invention is aimed at providing a swivel seal capable of withstanding the full working pressure whilst allowing rotational and swivel movement.

Furthermore, while the pressure of the fluid on the plug acts to keep it in pipe-sealing position, there is always a danger that the operating handle may be knocked sideways, as by a worker moving about in or falling into the hole affording access to the pipe, resulting in the plug being dislodged. Therefore, a third aspect of the present invention is aimed at ensuring secureness of the plug in pipe-sealing position.

According to the first aspect of the present invention, pipe plugging means of the type initially described also comprises a piston carried by the push-pull rod in slidable sealing engagement in a cylinder extending outside the swivel member of the swivel seal, that lower end of the cylinder being sealed to the swivel member and having the push-pull rod sealingly slidable within it, and the other upper end of the cylinder being slidably sealed on the push-pull rod, a vent hole to atmosphere being provided from the cylinder adjacent the swivel seal, and a bleed passageway being provided in the push-pull rod from adjacent the plug to just above the piston.

When the damper type valve is opened, in readiness for the plug to be pushed down, fluid admitted into the chamber is bled through the passageway in the push-pull rod to above the piston, thus pressurising the upper end of the cylinder to apply a downward load on the piston annulus to counterbalance the upward load on the push-pull rod, so that the plug can then be pushed down easily into the pipe.

A cylindrical hood may extend downwards from the operating handle to slide down over the outside of the cylinder when the plug is pushed down.

According to the second aspect of the present invention, the swivel seal in pipe plugging means in accordance with the first aspect of the invention comprises a swivel member formed like a ball having a bore through which the push-pull rod passes; a housing for the swivel member having an internal rebate accommodating guide bushes with part-spherical surfaces making close sliding fit with the swivel member, a sealing ring in a groove round the inside of the housing intermediate the guide bushes and making sealing engagement with the swivel member, a top ring fitting over the respective end of the housing and providing an inwardly projecting flange retaining the respective guide bush in the rebate in the housing, a sealing ring in a rebate at the bottom end of the housing and making sealing engagement with the chamber, bolting means between the top ring and the housing and bolting means for securing the housing on the chamber.

The bore of the swivel member is sealingly secured to the lower end of the cylinder, or—preferably—a reduced diameter extension of an end cap thereof, and by a sealing ring in a groove round the end cap extension. Thus, the swivel member may be provided with narrow annular flat faces at the ends of the bore to abut respectively against a shoulder on the end cap extension and a circular spring clip in a groove adjacent the lower end of the end cap extension. It will be apparent that the push-pull rod will be slidably sealed by a packing ring in a groove round the inside of the lower end of the cylinder or in the bore of its end cap extension.

According to the third aspect of the present invention, pipe plugging means in accordance with the first and/or second aspect of the invention is provided with securing means which comprises a bracket mountable on the chamber, an upstand on the bracket, and laterally-projecting adjustable locking means carried by the upstand for engagement with the push-pull rod assembly when the plug has been moved into sealing engagement in the pipe to one side of the hole, to secure the plug against accidental withdrawal from that position.

The bracket preferably takes the form of a circular handrail and the upstand is in the form of a semi-cylindrical shell with hooks to engage anywhere on the handrail, while the laterally-projecting adjustable locking means consists of a shaft slidable in a collar welded to the upstand, a locking screw in one side of the collar for engagement with the shaft, and a Yoke on the shaft for embracing the push-pull rod assembly.

An embodiment of the invention will now be described, by way of example only, with reference to the accompanying drawings, in which:

FIG. 1 is a vertical section through pipe plugging means in accordance with the invention shown in place on a pipe ready to be plugged;

FIG. 2 corresponds to FIG. 1 but shows the pipe plugging means after the plug has been pushed down into the pipe;

Figure 7:
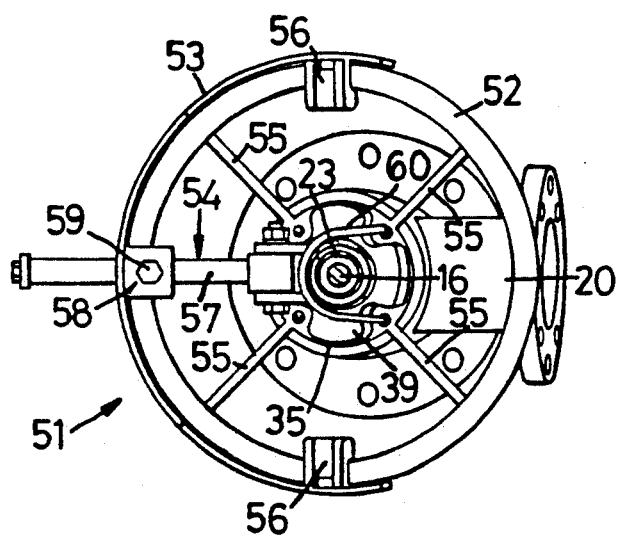
Figure 6:
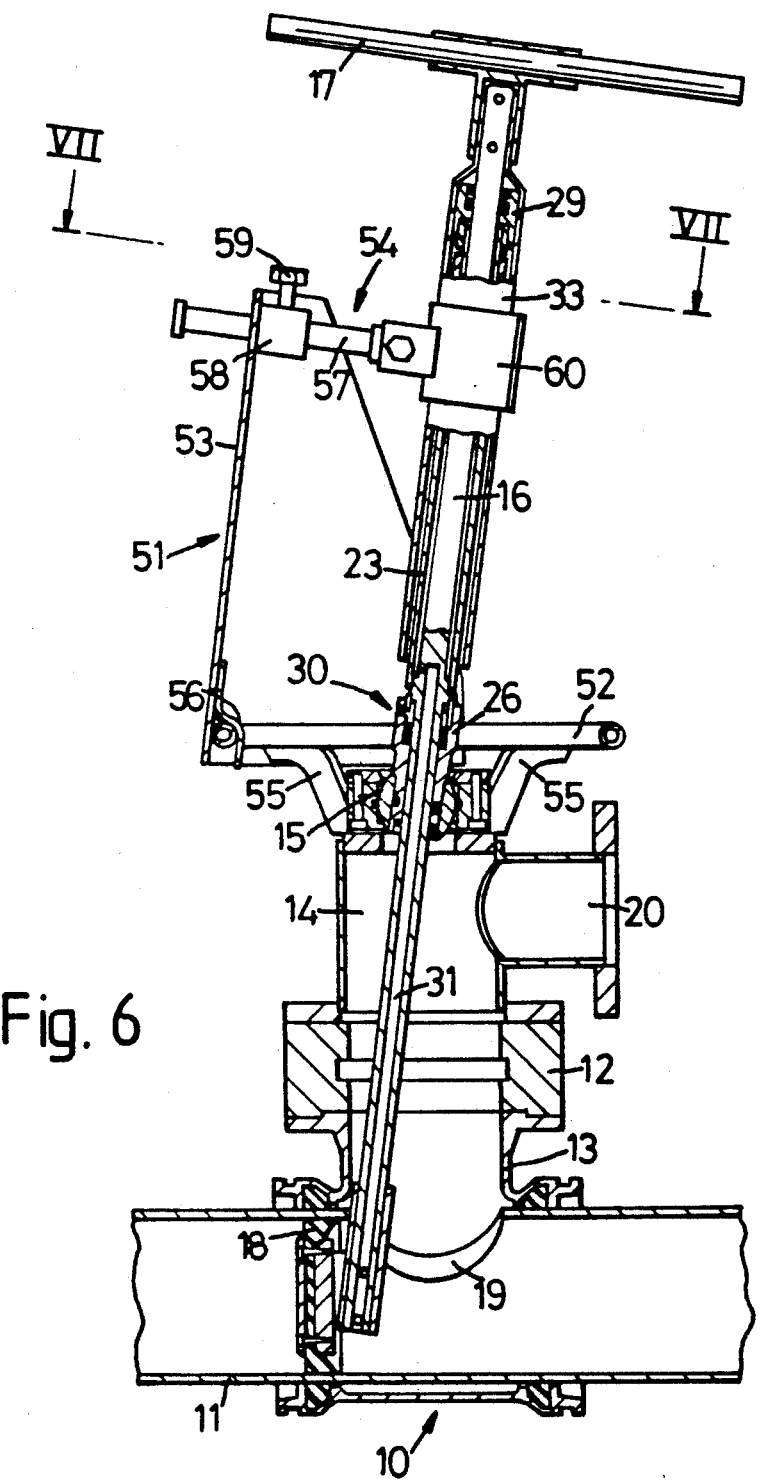

FIG. 6 corresponds to FIG. 2 but shows the plug after being moved sideways to fit sealingly in the pipe, and with securing means attached to secure the plug against accidental withdrawal from that position; and FIG. 7 is a part-sectional view taken from the line VII—VII in FIG. 6.

The pipe plugging means shown in the drawings consists basically of a split branch connection 10 for fitting around the pipe 11 to be plugged and having a damper type valve 12 for closing and opening the branch 13 (through which valve, in its open position, the pipe is drilled, the drilling machine—not shown—being removed after the valve has been closed), a chamber 14 sealed to the valve and having a swivel seal 15 for a push-pull rod 16 extending upwards from the inner side of the swivel seal to a operating handle 17 at the outer side of the swivel seal, and a pipe plug 18 carried by the inner end of the push-pull rod, the swivel seal 15 and the push-pull rod 16 enabling the plug 18 to be pushed down, after opening the valve 12, from within the chamber 14 (as shown in FIG. 1), down through the valve, the branch 13 and the hole 19 drilled in the pipe 11, into the pipe (as shown in FIG. 2), and then moved sideways to fit sealingly in the pipe to one side of the hole (as shown in FIG. 6).

The chamber 14 is shown with a branch 20 affording access to the pipe 11 after plugging (see FIG. 6), but in FIGS. 1 and 2 this branch is shown closed by a plate 21 to prevent gas escaping until such time as a by-pass may be established.

It will be appreciated that, without the features of the embodiment of the invention about to be described, with increasing gas pressures being encountered, the load on the plug 18 in the chamber 14 after opening of the valve 12 can be so great that it becomes extremely difficult—if not impossible—to push the plug 18 manually through the valve 12, the branch 13 and the hole 19 and into the pipe 11.

Therefore, in accordance with the invention, the pipe plugging means illustrated also comprises a piston 22 carried by the push-pull rod 16 in slidable sealing engagement in a cylinder 23 extending outside the swivel member 24 (see FIGS. 3 and 4) of the swivel seal 15, that lower end of the cylinder 23 being sealed to the swivel member (through an extension 25 of a lower end cap 26) and having the push-pull rod 16 sealingly slidable within it (by means of a gland packing 27 in the lower end cap), and the other upper end of the cylinder being slidably sealed on the push-pull rod (by means of a gland packing 28 in an upper end cap 29), a vent hole 30 to atmosphere being provided from the cylinder adjacent the swivel seal 15, and a bleed passageway 31 being provided in the push-pull rod 16 from adjacent the plug 18 to just above the piston 22 (where a lateral part 32 extends to the inside of the cylinder 23).

When the damper type valve 12 is opened, in readiness for the plug 18 to be pushed down, fluid admitted into the chamber 14 is bled through the passageway 31 in the push-pull rod 16 to above the piston 22, thus pressurising the upper end of the cylinder 23 to apply a downward load on the piston annulus to counterbalance the upward load on the push-pull rod, so that the plug 18 can then be pushed down easily into the pipe 11.

A cylindrical hood 33 extends downwards from the operating handle 17 to slide down over the upper end cap 29 of the cylinder 23 and surround the cylinder when the plug 18 is pushed down.

Figure 3:
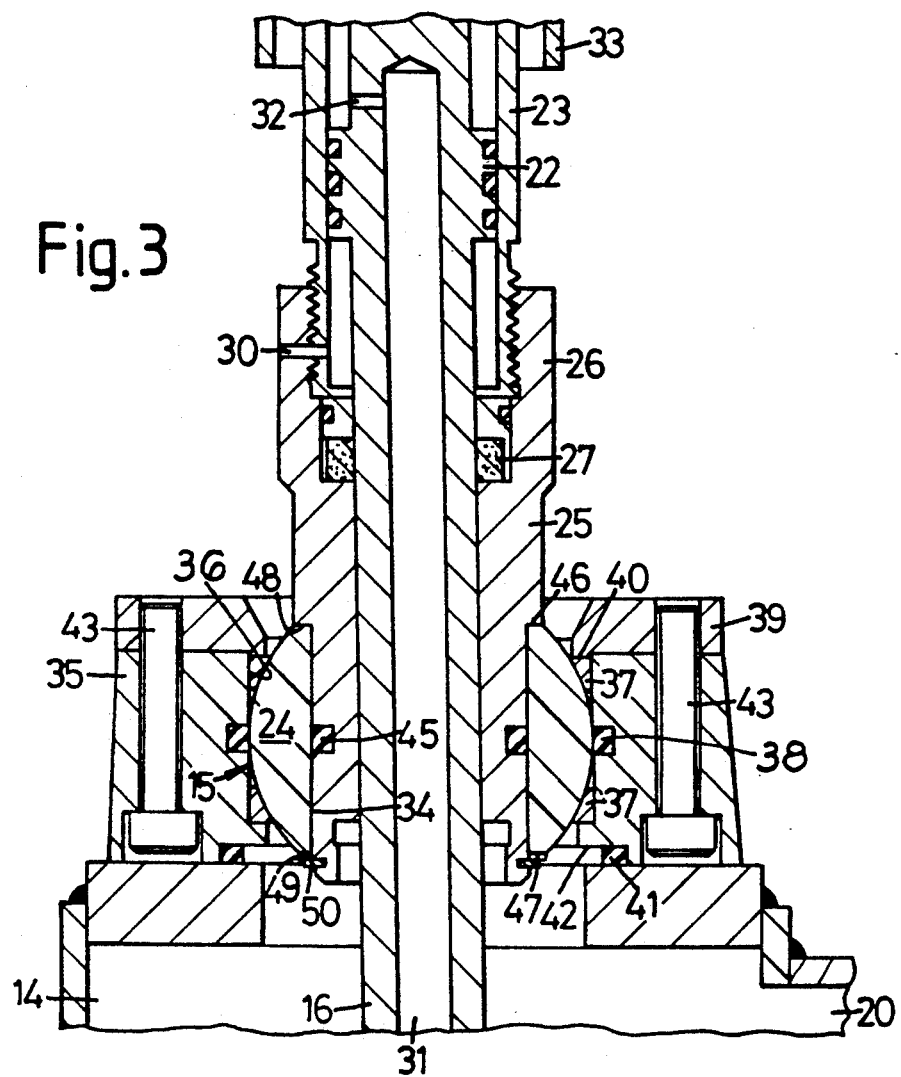
FIG. 3 is a fragmentary vertical section to a larger scale around the swivel seal and lower end of the cylinder as seen in FIG. 2.
Figure 4:
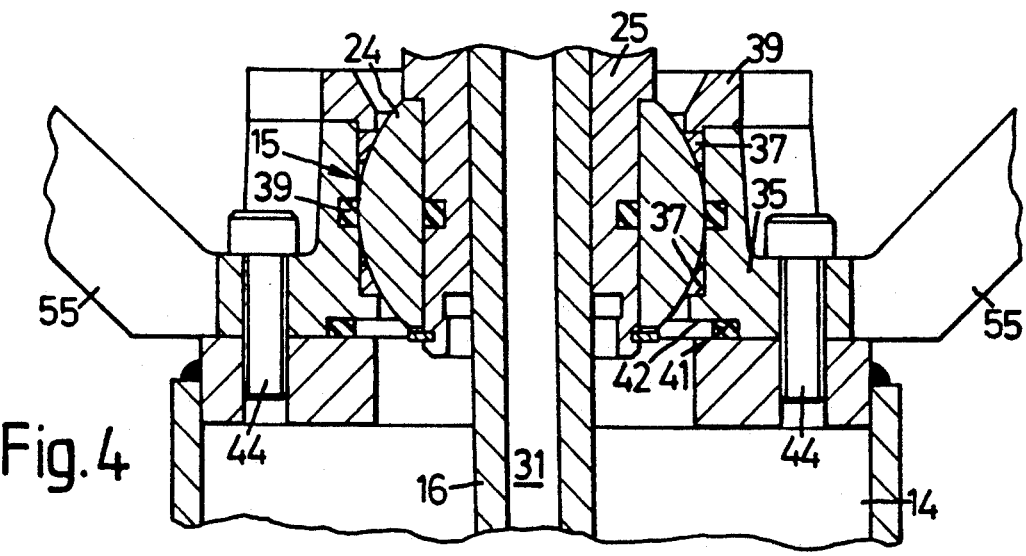
FIG. 4 is a fragmentary vertical section to the same scale as FIG. 3 of the swivel seal in a vertical plane at 45° to the plane of FIG. 3.
Figure 5:
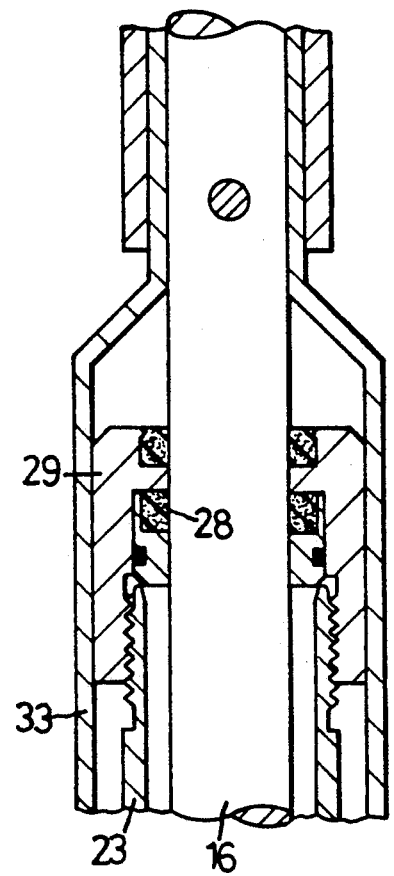
FIG. 5 is a fragmentary section to the same scale as FIGS. 3 and 4 around the upper end of the cylinder as seen in FIG. 2.

As best seen in FIGS. 3 and 4, the swivel seal 15 comprises the swivel member 24 which is formed like a ball having a bore 34 through which the push-pull rod 16 passes (within the extension 25 of the lower end cap 26 of the cylinder 23), a housing 35 for the swivel member having an internal rebate 36 accommodating guide bushes 37 with part spherical surfaces making close sliding fit with the swivel member, a sealing ring 38 in a groove round the inside of the housing intermediate the guide bushes and making sealing engagement with the swivel member, a top ring 39 fitting over the respective end of the housing 35 and providing an inwardly projecting flange 40 retaining the respective guide bush 37 in the rebate 36, a sealing ring 41 in a rebate 42 at the bottom end of the housing and making sealing engagement with the chamber 14, bolts 43 (FIG. 3) between the top ring 39 and the housing, and bolts 44 (FIG. 4) for securing the housing on the chamber.

The bore 34 of the swivel member 24 is sealingly secured to the reduced diameter extension 25 of the lower end cap 26 of the cylinder 23 by a sealing ring 45 in a groove round the end cap extension, and the swivel member 24 is provided with narrow annular flat faces 46, 47 at the ends of the bore 34 to abut respectively against a shoulder 48 on the end cap extension 25 and a washer 49 backed by a circular spring clip 50 in a groove adjacent the lower end of the end cap extension.

As shown in FIGS. 6 and 7, securing means 51 for securing the plug 18 against accidental withdrawal from the pipe 11 to one side of the hole 19 comprises a bracket 52 mountable on the chamber 14, an upstand 53 on the bracket, and laterally-projecting adjustable locking means 54 carried by the upstand for engagement with the push-pull rod assembly (16, 23, 33) when the plug has been moved into that position.

The bracket 52 takes the form of a circular handrail on arms 55 extending from the housing 35 of the swivel seal, and the upstand 53 is in the form of a part-cylindrical shell with hooks 56 to engage anywhere on the handrail, while the laterally-projecting adjustable locking means 54 consists of a shaft 57 slidable in a collar 58 welded to the upstand, a locking screw 59 in one side of the collar for engagement with the shaft, and a yoke 60 on the shaft for embracing the push-pull rod assembly (16, 23, 33) after the upstand 53 has been orientated on the bracket 52 with the shaft 57 and yoke 60 projecting from the upstand in the same direction as that in which the push-pull rod assembly above the swivel seal 15 has been swung in order to move the plug 18 into the pipe 11 at one side of the hole.

What I claim is:

1. A pipe plugger of the type consisting of a split branch connection for fitting around a pipe and having a damper type valve for closing and opening the branch, a chamber sealed to the valve and having a swivel seal and an actuating rod extending upwards from below the swivel seal, an operating handle on an upper end of the rod for pushing the rod down or pulling it up, and a pipe plug pivoted on a lower end of the actuating rod, the handle and the rod enabling the plug to be pushed down, after opening of the valve, from within the chamber, down through the valve, the branch and a hole drilled in the pipe, and into the pipe, and then the swivel seal enabling the actuating rod to be swung to move the plug sideways to fit sealingly in the pipe to one side of the hole; wherein a piston is carried by the actuating rod in slidable sealing engagement in a cylinder extending upwards from the movable member of the swivel seal, a lower end of the cylinder being sealed to the movable member of the swivel seal and having the actuating rod sealingly slidable within it, and an upper end of the cylinder being slidable sealed on the actuating rod, a vent hole to atmosphere being provided from the cylinder adjacent the swivel seal, and a bleed passageway being provided in the actuating rod from adjacent the plug to just above the piston.

2. A pipe plugger as in claim 1, wherein a cylindrical hood extends downwards from the operating handle to slide down over the upper end of the cylinder and surround the cylinder when the plug is pushed down.

3. A pipe plugger as in claim 1 or claim 2, wherein the movable member of the swivel seal comprises a ball having a bore through which the actuating rod passes, and the swivel seal also comprises a housing for the ball having an internal rebate accommodating guide bushes with part-spherical surfaces making close sliding fit with the ball, a sealing rind in a groove round the inside of the housing intermediate the guide bushes and making sealing engagement with the ball, a top ring fitting over the respective end of the housing and providing an inwardly projecting flange retaining the respective guide bush in the rebate in the housing, a sealing ring in a rebate at the bottom end of the housing and making sealing engagement with the chamber, bolts securing the top ring on the housing and bolts securing the housing on the chamber.

4. A pipe plugger as in claim 3, wherein the bore of the ball is secured to a reduced diameter extension of a lower end cap on the cylinder and sealed thereto by a sealing ring in a groove round the extension of the lower end cap.

5. A pipe plugger as in claim 4, wherein the ball is provided with narrow annular flat faces at the ends of the bore to abut respectively against a shoulder at the upper end of the reduced diameter extension of the end cap and a washer backed by a circular spring clip in a groove adjacent the lower end of the extension of the end cap.

6. A pipe plugger as in claim 1, further comprising securing structure comprising a bracket mountable on the chamber, an upstand on the bracket, and a laterally-projecting adjustable locking device carried by the upstand for engagement with the actuating rod assembly when the plug has been moved into sealing engagement in the pipe to one side of the hole, to secure the plug against accidental withdrawal from the position.

7. A pipe plugger as in claim 6, wherein the bracket takes the form of a circular handrail and the upstand is in the form of a semi-cylindrical shell with hooks to engage anywhere on the handrail, while the laterally-projecting adjustable locking device consists of a shaft slidable in a collar welded to the upstand, a locking screw in one side of the collar for engagement with the shaft, and a yoke on the shaft for embracing the actuating rod assembly.

* * * * *